United States Patent
Gao et al.

(10) Patent No.: US 10,506,474 B2
(45) Date of Patent: Dec. 10, 2019

(54) METHOD AND DEVICE FOR ESTABLISHING TRANSMISSION CHANNEL IN FUSION NETWORKING SYSTEM

(71) Applicant: ZTE CORPORATION, Shenzhen (CN)

(72) Inventors: Yin Gao, Shenzhen (CN); He Huang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/743,399

(22) PCT Filed: Apr. 7, 2016

(86) PCT No.: PCT/CN2016/078718
§ 371 (c)(1),
(2) Date: Jan. 10, 2018

(87) PCT Pub. No.: WO2016/180115
PCT Pub. Date: Nov. 17, 2016

(65) Prior Publication Data
US 2018/0206154 A1    Jul. 19, 2018

(30) Foreign Application Priority Data
Jul. 22, 2015 (CN) .......................... 2015 1 0435494

(51) Int. Cl.
*H04W 92/20* (2009.01)
*H04W 36/00* (2009.01)
(Continued)

(52) U.S. Cl.
CPC ... *H04W 36/0022* (2013.01); *H04W 36/0066* (2013.01); *H04W 76/12* (2018.02);
(Continued)

(58) Field of Classification Search
CPC ............. H04W 36/0022; H04W 76/15; H04W 36/0066; H04W 88/10; H04W 36/00; H04W 8/005
See application file for complete search history.

(56) References Cited

U.S. PATENT DOCUMENTS 8,374,612 B2 * 2/2013 Gao .................. H04W 36/0077
370/331
8,897,830 B2 * 11/2014 Gao ........................ H04W 8/26
455/524
(Continued)

FOREIGN PATENT DOCUMENTS

CN    101442507 A    5/2009
CN    101541008 A    9/2009
(Continued)

OTHER PUBLICATIONS

International Search Report in international application No. PCT/CN2016/078718, dated Jun. 27, 2016.
(Continued)

*Primary Examiner* — Lakeram Jangbahadur (57) ABSTRACT

Disclosed is a method and system for establishing a transmission channel in a fusion networking system. The method includes that an access side network element of a 3rd Generation Partnership Project (3GPP) system acquires Internet Protocol (IP) address information and/or port number information used when a Wireless Local Area Network (WLAN) system network element establishes an Xw interface, and initiates an establishment flow of a transmission channel of the Xw interface with the WLAN system network element according to the IP address information and/or the port number information.

6 Claims, 4 Drawing Sheets

(51) Int. Cl.
*H04W 76/15* (2018.01)
*H04W 76/12* (2018.01)
*H04W 8/00* (2009.01)
*H04W 88/10* (2009.01)
*H04W 84/12* (2009.01)

(52) U.S. Cl.
CPC ........... *H04W 76/15* (2018.02); *H04W 92/20* (2013.01); *H04W 8/005* (2013.01); *H04W 84/12* (2013.01); *H04W 88/10* (2013.01)

(56) References Cited

U.S. PATENT DOCUMENTS

| | | |
|---|---|---|
| 2007/0002811 A1 | 1/2007 | Faccin |
| 2013/0267166 A1 | 10/2013 | Gu |
| 2015/0109927 A1 | 4/2015 | Ozturk et al. |
| 2016/0302122 A1* | 10/2016 | Masini ............... H04L 61/1511 |
| 2016/0337903 A1* | 11/2016 | Cheng ................. H04W 28/12 |

FOREIGN PATENT DOCUMENTS

| | | |
|---|---|---|
| CN | 102281611 A | 12/2011 |
| CN | 102474891 A | 5/2012 |
| CN | 103313344 A | 9/2013 |
| CN | 104869666 A | 8/2015 |
| JP | 2006203580 A | 8/2006 |
| WO | 2015057343 A | 4/2015 |
| WO | WO 2015057343 A1 | 4/2015 |

OTHER PUBLICATIONS

Written Opinion of the International Search Authority in international application No. PCT/CN2016/078718, dated Jun. 27, 2016.
Huawei et al."Details of the IP tunnel solution for LTE-WLAN aggregation" 3GPP TSG-RAN WG2 Meeting #90 R2-152656, May 29, 2015 (May 29, 2015).
Huawei."Comparison of GTP-U and IP tunnel solutions for LTE-WLAN aggregation" 3GPP TSG-RAN2 Meeting #90 R2-152658, May 29, 2015 (May 29, 2015).
3GPP."Technical Specification Group Radio Access Network Study on Multiple Radio Access Technology (Multi-RAT) joint coordination" 3GPP TR 37.870V13.0.0,Jun. 30, 2015 (Jun. 30, 2015).
Huawei, "Details of the IP tunnel solution for LTE-WLAN aggegation", 3GPP TSG-RAN WG2 Meeting #90, Fukuoka, Japan. May 25-29, 2015.

* cited by examiner

FIG. 8 ical Engineers (IEEE) 802.11. A WLAN is a
METHOD AND DEVICE FOR ESTABLISHING TRANSMISSION CHANNEL IN FUSION NETWORKING SYSTEM

TECHNICAL FIELD

The disclosure relates to, but not limited to, the field of communications.

BACKGROUND

Figure 1:
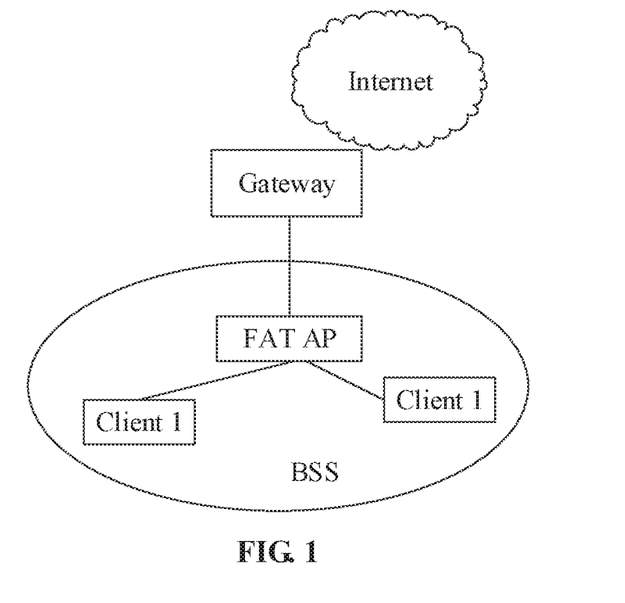
FIG. 1 is an architecture diagram of a WLAN system according to a related technology.

The mobile Internet is an industry developed fastest, having a greatest market potential and a most attractive prospect in the present world. Wireless access is a core technology in the mobile Internet industry. At present, multiple advanced Radio Access Technologies (RATs) (Multiple RAT: Multi-RAT) coexist, so that a user terminal may access a wireless network at a high speed and enjoy high-quality service. Typical technologies include a wireless wide area network access technology represented by Long Term Evolution (LTE) and a Wireless Local Area Network (WLAN) technology represented by Institute of Electrical and Electronic Engineers (IEEE) 802.11. A WLAN is a network constructed with a wireless communication technology within a certain local range, an architecture diagram of which is shown in FIG. 1. Compared with LTE, a WLAN is small in coverage, high in access rate and low in using cost.

As a typical representative of a 3rd Generation Partnership Project (3GPP) wireless communication family network, an LTE network is formed by an Evolved NodeB (eNB) of an Evolved Universal Mobile Telecommunications System (UMTS) Terrestrial Radio Access Network (E-UTRAN) and an Evolved Packet Core (EPC). The network is flattened. The E-UTRAN includes a set of eNBs connected with the EPC through an S1 interface, and the eNBs may be connected with one another through X2. S1 and X2 are logical interfaces. An EPC may manage one or more eNBs, A NodeB may also be controlled by multiple EPCs. An eNB may manage one or more cells. An LTE-Advance (LTE-A) system is evolved from an LTE system with a network architecture consistent with LTE. LTE is a 4th-Generation (4G) technology. Compared with 3rd-Generation (3G), LTE has technical advantages in multiple aspects of a higher data rate, low-delay transmission and guaranteed Quality of Service (QoS). Compared with a WLAN, LTE has wider coverage, and supports high-speed movement and roaming of a user terminal.

Figure 2:
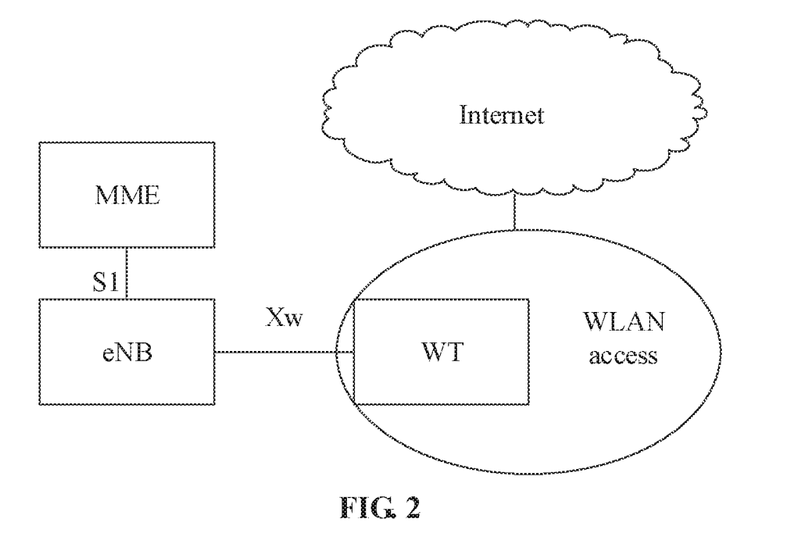
FIG. 2 is an architecture diagram of an LTE-WLAN fusion system according to the related technology.

Along with constant evolution of a communication network in the future, coexistence of network modes of multiple systems is an inevitable trend, including fusion networking of 2nd-Generation (2G), 3G and LTE, 3GPP-WLAN fusion networking or the like. For example, an LTE-WLAN fusion networking diagram is shown in FIG. 2. Due to complementary properties of a WLAN and a 3GPP wireless communication family network, 3GPP-WLAN interconnection and intercommunication become one of hot issues for equipment manufacturers, system integrators, operating companies and scientific research institutions. The basic principle is to reduce influence on existing standards and systems of the WLAN and the 3GPP as much as possible. That is, the WLAN standard is kept unchanged, and an existing 3GPP specification is minimally modified. A key for intercommunication and integrated structure design of the 3GPP and the WLAN is to provide an interaction function between the 3GPP and the WLAN on the basis of an IEEE 802.11 standard.

SUMMARY

The below is a summary about a theme described in the disclosure in detail. The summary is not intended to limit the scope of protection of the claims.

A key for intercommunication of the 3GPP and the WLAN is how to implement establishment of a direct interface between two systems. Here, "Wireless LAN Termination (WT)" is defined as a termination of an LTE-WLAN interface Xw at a WLAN system side. The WT may be considered as a logical entity, may be an independent network element, and may also be implemented on an Access Point (AP)/Access Controller (AC). Multiple WLAN access network elements may be connected to the WT. Since User Equipment (UE) may find different WLAN access network elements in a movement process, the Xw interface may be dynamically established in a self-optimization manner when 3GPP-WLAN aggregation is implemented.

Therefore, during fusion networking of the 3GPP and the WLAN, the problem of how to implement a direct interface of 3GPP-WLAN in a cross-system scenario is required to be solved so as to better implement self-optimization of the whole network and simultaneously improve user satisfactions.

The disclosure provides a method and device for establishing a transmission channel in a fusion networking system, to implement a direct interface between the 3GPP and the WLAN.

A method for establishing a transmission channel in a fusion networking system may include that an access side network element of a 3GPP system acquires Internet Protocol (IP) address information and/or port number information used when a WLAN system network element establishes an Xw interface, and initiates an establishment flow of a transmission channel of the Xw interface with the WLAN system network element according to the IP address information and/or the port number information.

In an example, the IP address information and/or port number information used when the WLAN system network element establishes the Xw interface may be acquired in one or more of the following manners.

In a first manner, the access side network element of the 3GPP system acquires the IP address information and/or port number information, available for Xw interface establishment, of the WLAN system network element through configuration information.

In a second manner, the access side network element of the 3GPP system receives description information of the WLAN system network element, reported by UE, and obtains the IP address information and/or port number information for Xw interface establishment according to the description information of the WLAN system network element.

In a third manner, the access side network element of the 3GPP system receives the IP address information and/or port number information of the WLAN system network element, sent by the WLAN system network element through a core network element.

In an example, the first manner may further include that, if the WLAN system network element is connected with one or more APs, association information of the WLAN system network element with the one or more APs is recorded.

In an example, in the first manner, the configuration information may be generated by the access side network element of the 3GPP system, or, may be generated by an Operation Administration and Management (OAM) network element.

In an example, in the second manner, the description information of the WLAN system network element may be the IP address information and/or port number information of the WLAN system network element. Alternatively, the description information of the WLAN system network element may be identification information of a WLAN where the WLAN system network element is located, the WLAN system network element corresponding to the identification information of the WLAN may be determined according to the identification information of the WLAN, and the IP address information and/or port number information of the WLAN system network element may be acquired.

In an example, the identification information of the WLAN may include at least one of: a Media Access Control (MAC) address of the WLAN system network element, a MAC address of an AP, a Basic Service Set Identifier (BSSID) and an Extended Service Set Identifier (ESSID).

In an example, in the third manner, the IP address information and/or port number information of the WLAN system network element may be obtained in the following manner: the access side network element of the 3GPP system sends a transmission address request message to the WLAN system network element through the core network element; and the access side network element of the 3GPP system receives a transmission address response message from the WLAN system network element through the core network element. Herein, the transmission address response message may include the IP address information and/or port number information of the WLAN system network element.

In an example, in the third manner, the transmission address request message may include equipment flag information of the WLAN system network element, or, the transmission address request message may include equipment flag information of the access side network element of the 3GPP system and the equipment flag information of the WLAN system network element; and the transmission address response message may include the equipment flag information of the access side network element of the 3GPP system, or, the transmission address response message may include the equipment flag information of the access side network element of the 3GPP system and the equipment flag information of the WLAN system network element.

In an example, in the third manner, if the WLAN system network element fails to process the transmission address request message, the method may further include that: the access side network element of the 3GPP system receives a transmission address response failure message through the core network element. Herein, the transmission address response failure message may include the equipment flag information of the access side network element of the 3GPP system and at least one of the equipment flag information of the WLAN system network element, a failure cause and waiting time. The waiting time may be configured to indicate the access side network element of the 3GPP system to reinitiate an acquisition flow after the waiting time expires.

In an example, the access side network element of the 3GPP system may be an eNB or a Radio Network Controller (RNC), and the WLAN system network element may be a WT or an AP or an AC.

A device for establishing a transmission channel in a fusion networking system may be applied to an access side network element of a 3GPP system, and the device may include an acquisition module, configured to acquire IP address information and/or port number information used when a WLAN system network element establishes an Xw interface; and an establishment module, configured to initiate an establishment flow of a transmission channel of the Xw interface with the WLAN system network element according to the IP address information and/or the port number information.

In an example, the acquisition module may be configured to acquire the IP address information and/or port number information used when the WLAN system network element establishes the Xw interface in the following manners of a first manner of acquiring the IP address information and/or port number information, available for Xw interface establishment, of the WLAN system network element through configuration information; a second manner of receiving description information, reported by UE, of the WLAN system network element, and obtaining the IP address information and/or port number information for Xw interface establishment according to the description information of the WLAN system network element; and a third manner of receiving the IP address information and/or port number information of the WLAN system network element, sent by the WLAN system network element through a core network element.

In an example, in the first manner, the acquisition module may further be configured to, if the WLAN system network element is connected with one or more APs, record association information of the MILAN system network element with the one or more APs.

In an example, in the first manner, the configuration information may be generated by the access side network element of the 3GPP system, or, may be generated by an OAM network element.

In an example, in the second manner, the description information of the WLAN system network element may be the IP address information and/or port number information of the WLAN system network element. Alternatively, the description information of the WLAN system network element may be identification information of a WLAN where the WLAN system network element is located, and the acquisition module may be configured to determine the WLAN system network element corresponding to the identification information of the WLAN according to the identification information of the WLAN, and acquire the IP address information and/or port number information of the WLAN system network element.

In an example, the identification information of the MILAN may include at least one of: a MAC address of the WLAN system network element, a MAC address of an AP, a BSSID and an ESSID.

In an example, in the third manner, the acquisition module may be configured to obtain the IP address information and/or port number information of the WLAN system network element in the following manner of sending a transmission address request message to the WLAN system network element through the core network element; and receiving a transmission address response message from the WLAN system network element through the core network element. Herein, the transmission address response message may include the IP address information and/or port number information of the WLAN system network element.

In an example, in the third manner, the transmission address request message may include equipment flag information of the WLAN system network element, or, the transmission address request message may include equipment flag information of the access side network element of the 3GPP system and the equipment flag information of the WLAN system network element; and the transmission address response message may include the equipment flag information of the 3GPP system access side network element, or, the transmission address response message may include the equipment flag information of the access side network element of the 3GPP system and the equipment flag information of the WLAN system network element.

In an example, in the third manner, the device may further include a receiving module, configured to, if the WLAN system network element fails to process the transmission address request message, receive a transmission address response failure message through the core network element. Herein, the transmission address response failure message may include the equipment flag information of the access side network element of the 3GPP system and at least one of the equipment flag information of the WLAN system network element, a failure cause and waiting time. The waiting time may be configured to indicate the 3GPP system network element to reinitiate an acquisition flow after the waiting time expires.

In an example, the device may be located in an eNB or an RNC, and the WLAN system network element may be a WT or an AP or an AC.

A computer-readable storage medium may store computer-executable instructions, and the computer-executable instructions may be configured to execute any of the above-mentioned methods.

According to embodiments provided by the disclosure, the access side network element of the 3GPP system acquires the IP address information and/or port number information used by the WLAN system network element for establishing the Xw interface to obtain information of the opposite end required by channel establishment, and then initiates the establishment flow of the transmission channel according to the obtained information. Therefore, a direct interface of 3GPP-WLAN is implemented.

After the drawings and the detailed descriptions are read and understood, the other aspects may be comprehended.

DETAILED DESCRIPTION

Implementation modes of the disclosure will be described below in combination with the drawings and the embodiments. It is noted that the embodiments of the disclosure and characteristics in the embodiments may be freely combined without conflicts.

Figure 3:
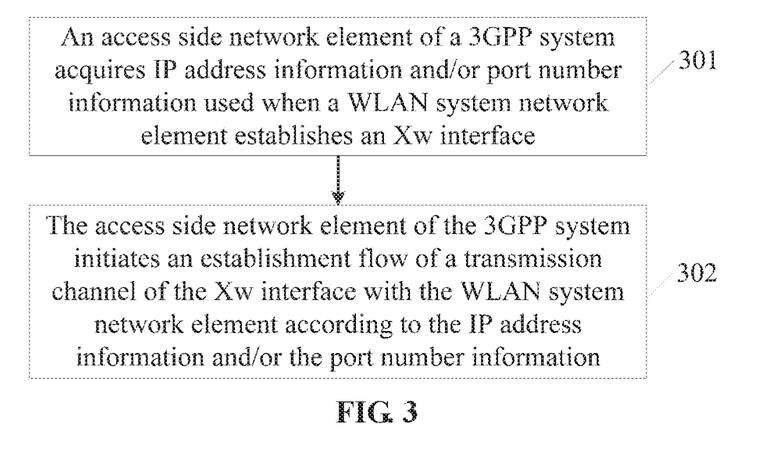
FIG. 3 is a flowchart of a method for establishing a transmission channel in a fusion networking system according to the disclosure.

FIG. 3 is a flowchart of a method embodiment for establishing a transmission channel in a fusion networking system according to the disclosure. As shown in FIG. 3, the method includes the following steps.

In step 301, an access side network element of a 3GPP system acquires IP address information and/or port number information used when a WLAN system network element establishes an Xw interface.

Herein, the access side network element of the 3GPP system is an eNB or an RNC, and the WLAN system network element may be an AP or an AC.

In step 302, the access side network element of the 3GPP system initiates an establishment flow of a transmission channel of the Xw interface with the WLAN system network element according to the IP address information and/or the port number information.

According to the method embodiment provided by the disclosure, the access side network element of the 3GPP system acquires the IP address information and/or port number information used by the WLAN system network element for establishing the Xw interface to obtain information of the opposite end required by channel establishment, and then initiates the establishment flow of the transmission channel according to the obtained information. Therefore, a direct interface of 3GPP-WLAN is implemented.

The method provided by the embodiment of the disclosure will be further described below.

Herein, the IP address information and/or port number information used by the WLAN system network element for Xw interface establishment are/is acquired in one or more of the following three manners.

In a first manner the access side network element of the 3GPP system acquires the IP address information and/or port number information, available for Xw interface establishment, of the WLAN system network element through configuration information.

Herein, the configuration information is generated by the access side network element of the 3GPP system. Alternatively, the configuration information is generated by an OAM network element.

Descriptions will be made with the condition that the access side network element of the 3GPP system is an eNB as an example. One or more pieces of WT information available for establishment of the Xw interface are configured on the access side network element of the 3GPP system, for example, the IP address information and/or port number information for the Xw interface establishment. Under the condition that a WT is connected with multiple APs, associated record information of the WT with the multiple APs may further be included during configuration.

In addition, if the WLAN system network element is connected with at least two APs, association information of the WLAN system network element with the at least two APs is recorded.

In a second manner, the access side network element of the 3GPP system receives description information, reported by UE, of the WLAN system network element, and obtains the IP address information and/or port number information for establishment of the Xw interface according to the description information of the WLAN system network element.

Herein the description information of the WLAN system network element is the IP address information and/or port number information of the WLAN system network element. Alternatively, the description information of the WLAN system network element is identification information of a WLAN where the WLAN system network element is located, then the WLAN system network element corresponding to the identification information of the WLAN is determined according to the identification information of the WLAN, and the IP address information and/or port number information of the WLAN system network element are/is acquired.

For example, the IP address information and/or port number information of the WT, for establishing the Xw interface, are/is acquired at an air interface through the UE, and are/is reported to the access side network element of the 3GPP system. Alternatively, the corresponding WT IP address information and/or port number information are/is locally searched via a WT/AP MAC address, and/or BSSID and/or ESSID or other equipment flag information reported by the UE.

In a third manner, the access side network element of the 3GPP system receives the IP address information and/or port number information, sent by the WLAN system network element through a core network element, of the WLAN system network element.

Herein the IP address information and/or port number information of the WLAN system network element are/is obtained in the following manner, including that, the access side network element of the 3GPP system sends a transmission address request message to the WLAN system network element through the core network element; and the access side network element of the 3GPP system receives a transmission address response message from the WLAN system network element through the core network element. Herein the transmission address response message includes the IP address information and/or port number information of the WLAN system network element. The transmission address request message includes equipment flag information of the WLAN system network element. Alternatively, the transmission address request message includes equipment flag information of the access side network element of the 3GPP system and the equipment flag information of the WLAN system network element. The transmission address response message includes the equipment flag information of the 3GPP system access side network element, or, the transmission address response message includes the equipment flag information of the access side network element of the 3GPP system and the equipment flag information of the WLAN system network element.

If the WLAN system network element fails to process the transmission address request message, the 3GPP system network element receives a transmission address response failure message through the core network element. Herein the transmission address response failure message includes the equipment flag information of the access side network element of the 3GPP system and at least one of the equipment flag information of the WLAN system network element, a failure cause and waiting time. Herein the waiting time is configured to indicate the 3GPP system network element to reinitiate an acquisition flow after the waiting time.

For example, after the WP AP to be aggregated is determined, the IP address information and port number information of the opposite end, for the Xw interface establishment, are acquired through an existing core network interface.

Method One

In step one, a source system network element constructs a transmission address direct transfer message, and sends the message to a core network. The message includes information of a target system network element (for example, equipment flag information of the target system network element), information of the source system network element (for example, equipment flag information of the source system network element) and transmission address information and/or port number information (one or more pieces), for establishing the Xw interface, of the source system network element.

In step two, the core network transmits the transmission address direct transfer message to the target system network element.

In step three, after receiving the transmission address direct transfer message, the target system network element may initiate an establishment flow of the Xw interface with the source system network element according to the transmission address information and/or port number information, contained in the message, of the source system network element.

Method Two

In step one, a source system network element constructs a transmission address request message, and sends the message to a core network. The message includes information of a target system network element (for example, equipment flag information of the target system network element) and information of the source system network element (for example, equipment flag information of the source system network element).

In step two, the core network transparently transmits the transmission address request message to the target system network element through the core network.

In step three, after receiving the transmission address request message, the target system network element constructs a transmission address response message for sending to the core network, the message including the information of the target system network element (for example, the equipment flag information of the target system network element), the information of the source system network element (for example, the equipment flag information of the source system network element) and transmission address information and/or port number information (one or more pieces), for establishing the Xw interface, of the target system network element.

In step four, the core network transparently transmits the transmission address response message to the source system network element.

In step five, after receiving the transmission address response message, the source system network element may initiate an establishment flow of the Xw interface with the target system network element according to the transmission address information, contained therein, of the target system network element.

If failing to process the transmission address request message, the target system network element constructs a transmission address response failure message for sending to the core network, the message including the information of the target system network element (for example, the equipment flag information of the target system network element), the information of the source system network element (for example, the equipment flag information of the source system network element), a failure cause (for example, the cause is a request message cell analysis error and a transmission address acquisition error) and waiting time. Herein waiting time cell means that the source system network element may reinitiate an acquisition flow after the waiting time expires. The transmission address response failure message is transparently transmitted to the source system network element by the core network.

It is noted that, in the third manner, the operation that the establishment flow of the transmission channel of the Xw interface with the WLAN system network element includes that the transmission channel of the Xw interface is established with the WLAN system network element according to the IP address information and/or the port number information. Alternatively, IP address information and/or port number information in information of the access side network element of the 3GPP system are/is sent to the WLAN system network element through the core network element, and a response is given to an establishment flow, initiated by the WLAN system network element according to the IP address information and/or port number information in the information of the 3GPP system access side network element, of the transmission channel of the Xw interface with the WLAN system network element.

It can be seen from the above that, with the method, a transmission address of a target system side network element for establishing an Xw interface with a current system side network element may be timely acquired, so that the direct Xw interface may be established between the network elements, information interaction between systems is favorably implemented, and self-configuration and self-optimization for interface establishment are implemented.

For convenient description, in the following embodiments, the access side network element of the 3GPP system is, for example, an eNB, and the WLAN system network element is, for example, a WT.

Embodiment One

Figure 4:
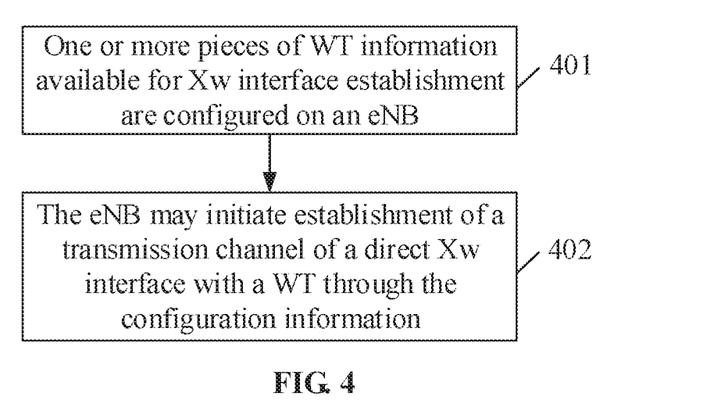
FIG. 4 is a flowchart of a method for establishing a transmission channel in a fusion networking system according to embodiment one of the disclosure.

FIG. 4 is a flowchart of a method for establishing a transmission channel in a fusion networking system according to embodiment one of the disclosure. As shown in FIG. 4, the method includes the following steps.

In step 401, one or more pieces of WT information available for establishing an Xw interface are configured on an eNB. The configured WT information includes one or more of IP address information and port number information of a WT for establishing the Xw interface, and information of multiple APs connected to the WT, including, for example, associated record information of the WT with the multiple APs.

In step 402, after the eNB is powered on, the eNB may initiate establishment of a transmission channel of a direct Xw interface with the WT through the configuration information.

Embodiment Two

Figure 5:
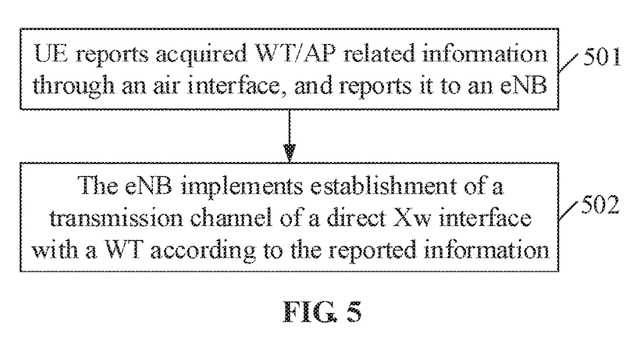
FIG. 5 is a flowchart of a method for establishing a transmission channel in a fusion networking system according to embodiment two of the disclosure.

FIG. 5 is a flowchart of a method for establishing a transmission channel in a fusion networking system according to embodiment two of the disclosure. As shown in FIG. 5, the method includes the following steps.

In step 501, a UE acquires WT/AP related information through an air interface, and reports it to an eNB. Herein the WT/AP information includes one or more of: IP address information and port number information of a WT for establishing the Xw interface, a MAC address of the WT/AP, and/or a BSSID, and/or an ESSID or other equipment flag information.

In step 502, the eNB directly acquires or locally searches to acquire the corresponding WT IP address information and/or port number information according to the WT/AP related information reported by the UE, and initiates establishment of a transmission channel of a direct Xw interface with the WT.

Embodiment Three

Figure 6:
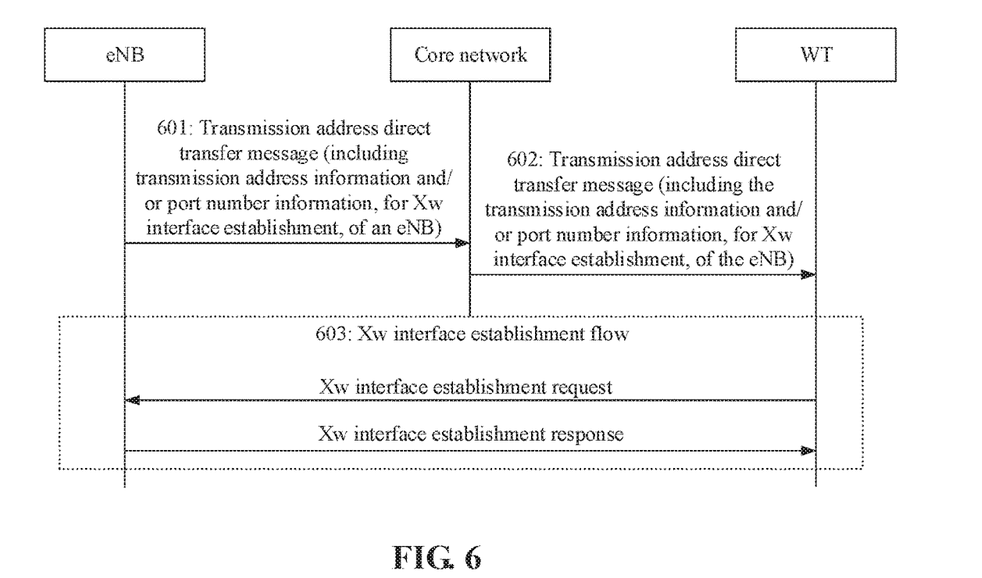
FIG. 6 is a flowchart of a method for establishing a transmission channel in a fusion networking system according to embodiment three of the disclosure.

FIG. 6 is a flowchart of a method for establishing a transmission channel in a fusion networking system according to embodiment three of the disclosure. As shown in FIG. 6, the method includes the following steps.

In step 601, an eNB is required to establish an Xw interface with a WT, and the eNB constructs a transmission address direct transfer message, and sends the message to a Mobility Management Entity (MME). The message may include information of the target WT (equipment flag information or routing information of the WT/AP), information of the source eNB (a global identifier of the eNB) and transmission address information and/or port number information (one or more pieces), for establishing the Xw interface, of the eNB.

In step 602, the MME transparently transmits the transmission address direct transfer message to the WT through a WLAN core network.

In step 603, after receiving the transmission address direct transfer message, the WT may initiate an Xw interface establishment flow with the source eNB according to the transmission address information, contained in the message, of the source eNB.

Embodiment Four

Figure 7:
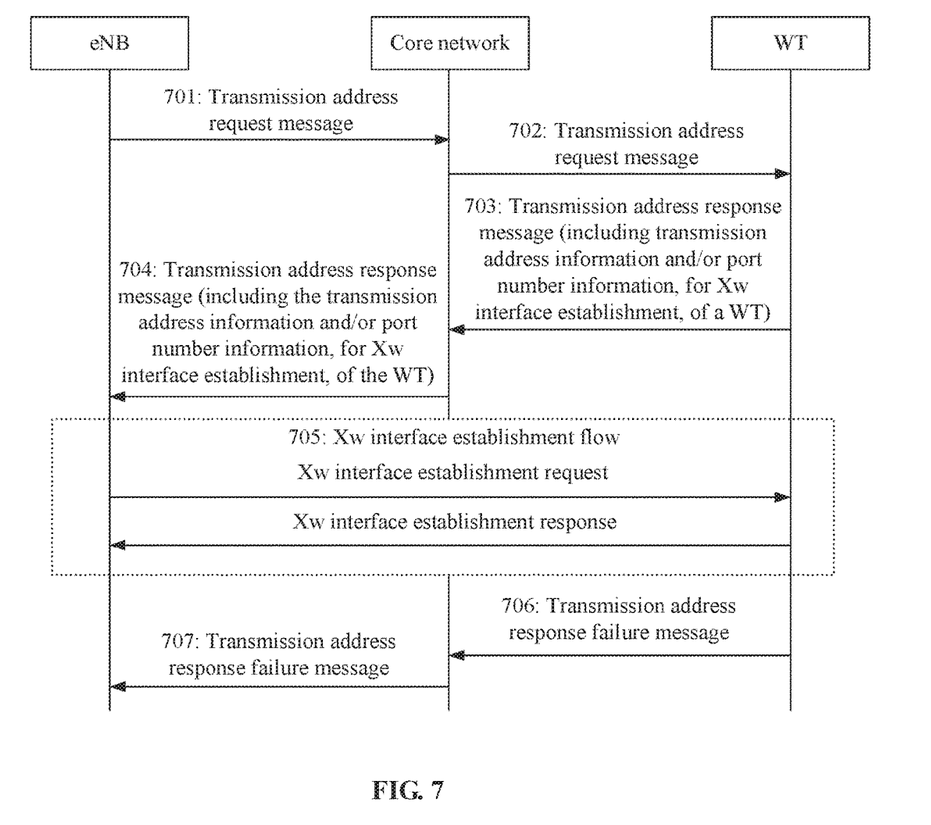
FIG. 7 is a flowchart of a method for establishing a transmission channel in a fusion networking system according to embodiment four of the disclosure.

FIG. 7 is a flowchart of a method for establishing a transmission channel in a fusion networking system according to embodiment four of the disclosure. As shown in FIG. 7, the method includes the following steps.

In step 701, an eNB is required to establish an Xw interface with a WT, and the eNB constructs a transmission address request message, and sends the message to an MME. The message includes information of the target WT (equipment flag information or routing information of the WT/AP) and information of the source eNB (a global identifier of the eNB).

In step 702, after receiving the transmission address request message, the MME transparently transmits the message to the WT through a WLAN core network.

In step 703, after receiving the transmission address request message, the WT, if succeeds in processing, constructs a transmission address response message for sending to the MME through a WT core network, the message including the information of the target WT (the equipment flag information or routing information of the WT/AP), the information of the source eNB (the global identifier of the eNB) and transmission address information and/or port number information (one or more pieces), for Xw interface establishment, of the target WT, and turns to step 704, and if fails to process, turns to step 706.

In step 704, the MME, transparently transmits the transmission address response message to the eNB.

In step 705, after receiving the transmission address response message, the eNB may initiate an establishment flow of the Xw interface with the WT according to the transmission address information and/or port number information, contained therein, of the WT.

In step 706, the WT constructs a transmission address response failure message for sending to the MME. The message may include the information of the target WT (the equipment flag information or routing information of the WT/AP), the information of the eNB (the global identifier of the eNB), a failure cause (for example, the cause is a transmission address processing error) and waiting time. Herein the waiting time is optional, and means that the source eNB may reinitiate an acquisition flow after the waiting time expires.

In step 707, the MME transparently transmits the transmission address response failure message to the eNB.

During practical implementation, the access side network element of the 3GPP system may be an eNB or an RNC, and the WLAN system network element may be a WT, or an AP or an AC.

Herein, embodiments 3 and 4 may also be inversely executed.

An embodiment of the disclosure further provides a computer-readable storage medium having computer-executable instructions stored therein, the computer-executable instructions being configured to execute the method for establishing the transmission channel in the fusion networking system.

Figure 8:
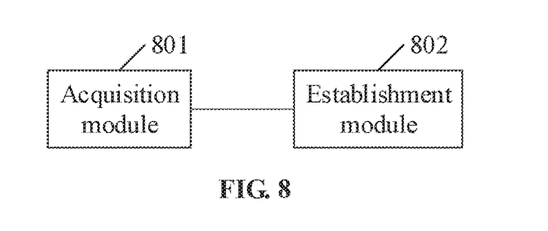
FIG. 8 is a structure diagram of a device for establishing a transmission channel in a fusion networking system according to an embodiment of the disclosure.

FIG. 8 is a structure diagram of a device for establishing a transmission channel in a fusion networking system according to an embodiment of the disclosure. As shown in FIG. 8, the device is applied to an access side network element of a 3GPP system, and the device includes an acquisition module 801 and an establishment module 802.

The acquisition module 801 is configured to acquire IP address information and/or port number information used when a WLAN system network element establishes an Xw interface.

The establishment module 802 is configured to initiate an establishment flow of a transmission channel of an Xw interface with the WLAN system network element according to the IP address information and/or the port number information.

Herein, the acquisition module 801 is configured to acquire the IP address information and/or port number information used by the WLAN system network element for establishing the Xw interface in the following manners.

In a first manner the access side network element of the 3GPP system acquires the IP address information and/or port number information, available for establishing the Xw interface, of the WLAN system network element through configuration information.

In a second manner, the access side network element of the 3GPP system receives description information, reported by UE, of the WLAN system network element, and obtains the IP address information and/or port number information for establishing the Xw interface according to the description information of the WLAN system network element.

In a third manner, the access side network element of the 3GPP system receives the IP address information and/or port number information, sent by the WLAN system network element through a core network element, of the WLAN system network element.

Herein, in the first manner, the acquisition module 801 is further configured to, if the WLAN system network element is connected with one or more APs, record association information of the WLAN system network element with the one or more APs.

Herein, in the first manner, the configuration information is generated by the access side network element of the 3GPP system, or, is generated by an OAM network element.

Herein, in the second manner, the description information of the WLAN system network element is the IP address information and/or port number information of the WLAN system network element; or, the description information of the WLAN system network element is identification information of a WLAN where the WLAN system network element is located, then the WLAN system network element corresponding to the identification information of the WLAN is determined according to the identification information of the WLAN, and the IP address information and/or port number information of the WLAN system network element are/is acquired.

Herein, the identification information of the WLAN includes at least one of: a MAC address of the WLAN system network element, a MAC address of an AP, a BSSID and an ESSID.

Herein, in the third manner, the acquisition module 801 is configured to obtain the IP address information and/or port number information of the WLAN system network element in the following manner of sending a transmission address request message to the WLAN system network element through the core network element; and receiving a transmission address response message from the WLAN system network element through the core network element. Herein the transmission address response message includes the IP address information and/or port number information of the WLAN system network element.

Herein, in the third manner, the transmission address request message includes equipment flag information of the WLAN system network element, or, the transmission address request message includes equipment flag information of the access side network element of the 3GPP system and the equipment flag information of the WLAN system network element. The transmission address response message includes the equipment flag information of the access side network element of the 3GPP system, or, the transmission address response message includes the equipment flag information of the access side network element of the 3GPP system and the equipment flag information of the WLAN system network element.

Herein, in the third manner, the device further includes a receiving module, configured to, if the WLAN system network element fails to process the transmission address request message, receive a transmission address response failure message through the core network element. The transmission address response failure message includes the equipment flag information of the access side network element of the 3GPP system and at least one of the equipment flag information of the WLAN system network element, a failure cause and waiting time. Herein the waiting time is configured to indicate the 3GPP system network element to reinitiate an acquisition flow after the waiting time expires.

Herein, the device is located in an eNB or an RNC, and the WLAN system network element is a WT or an AP or an AC.

According to the device embodiment provided by the disclosure, the access side network element of the 3GPP system acquires the IP address information and/or port number information used by the WLAN system network element for Xw interface establishment to obtain information of the opposite end required by channel establishment, and then initiates the establishment flow of the transmission channel according to the obtained information. Therefore, a direct interface of 3GPP-WLAN is implemented.

Those skilled in the art should know that all or part of the steps of the embodiments may be implemented by a flow of a computer program. The computer program may be stored in a computer-readable storage medium. The computer program is executed on a corresponding hardware platform (for example, a system, equipment, a device and an apparatus), and during execution, one or combination of the steps of the method embodiments is included.

In an example, all or part of the steps of the embodiments may further be implemented by an integrated circuit, these steps may form multiple integrated circuit modules respectively, or multiple modules or steps therein may form a single integrated circuit module for implementation. Therefore, the disclosure is not limited to any specific hardware and software combination.

The devices/function modules/units in the embodiments may be implemented by adopting a universal computing device, and they may be concentrated on a single computing device, and may also be distributed on a network formed by multiple computing devices.

When being implemented in form of software function module and sold or used as independent products, the devices/function modules/function units in the embodiments may be stored in a computer-readable storage medium. The abovementioned computer-readable storage medium may be a read-only memory, a magnetic disk, an optical disk or the like.

The above is only the implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure should be in accordance with the scope of protection of the claims.

INDUSTRIAL APPLICABILITY

By the embodiments of the disclosure, the access side network element of the 3GPP system acquires the IP address information and/or port number information used by the WLAN system network element for establishing the Xw interface to obtain information of the opposite end required by channel establishment, and then initiates the establishment flow of the transmission channel according to the obtained information. Therefore, a direct interface of 3GPP-WLAN is implemented.

The invention claimed is:

1. A method for establishing a transmission channel in a fusion networking system, comprising:
   acquiring, by an access side network element of a 3rd Generation Partnership Project (3GPP) system, at least one of Internet Protocol (IP) address information or port number information used when a Wireless Local Area Network (WLAN) system network element establishes an Xw interface; and
   initiating an establishment flow of a transmission channel of the Xw interface with the WLAN system network element according to the at least one of the IP address information or the port number information,
   wherein acquiring, by the access side network element of the 3GPP system, the at least one of the IP address information or the port number information used when the WLAN system network element establishes the Xw interface comprises:
   receiving, by the access side network element of the 3GPP system, the at least one of the IP address information or the port number information of the WLAN system network element, sent by the WLAN system network element through a core network element,
   wherein the at least one of the IP address information or the port number information of the WLAN system network element is obtained in the manner of sending, by the access side network element of the 3GPP system, a transmission address request message to the WLAN system network element through the core network element; and receiving, by the access side network element of the 3GPP system, a transmission address response message from the WLAN system network element through the core network element, wherein the transmission address response message comprises the at least one of the IP address information or the port number information of the WLAN system network element,
   wherein the transmission address request message comprises equipment flag information of the WLAN system network element, or, the transmission address request message comprises equipment flag information of the access side network element of the 3GPP system and the equipment flag information of the WLAN system network element; and
   the transmission address response message comprises the equipment flag information of the access side network element of the 3GPP system, or, the transmission address response message comprises the equipment flag information of the access side network element of the 3GPP system and the equipment flag information of the WLAN system network element.

2. The method according to claim 1, wherein, if the WLAN system network element fails to process the transmission address request message, the method further comprises:
   receiving, by the access side network element of the 3GPP system, a transmission address response failure message through the core network element, wherein the transmission address response failure message comprises the equipment flag information of the access side network element of the 3GPP system and at least one of the equipment flag information of the WLAN system network element, a failure cause or waiting time, wherein the waiting time is configured to indicate the access side network element of the 3GPP system to reinitiate an acquisition flow after the waiting time expires.

3. The method according to claim 1, wherein the access side network element of the 3GPP system is an Evolved NodeB (eNB) or a Radio Network Controller (RNC), and the WLAN system network element is a Wireless LAN Termination (WT) or an AP or an Access Controller (AC).

4. A device for establishing a transmission channel in a fusion networking system, applied to an access side network element of a 3rd Generation Partnership Project (3GPP) system, the device comprising:
   a processor including a circuit; and
   a memory coupled to the processor,
   wherein the process is configured to:
      acquire at least one of Internet Protocol (IP) address information or port number information used when a Wireless Local Area Network (WLAN) system network element establishes an Xw interface; and
      initiate an establishment flow of a transmission channel of the Xw interface with the WLAN system network element according to the at least one of the IP address information or the port number information,
   wherein the processor is configured to acquire the at least one of the IP address information or the port number information used when the WLAN system network element establishes the Xw interface in the following manner:

receiving the at least one of the IP address information or the port number information of the WLAN system network element, sent by the WLAN system network element through a core network element, wherein the processor is configured to obtain the at least one of the IP address information or the port number information of the WLAN system network element in the manner of sending a transmission address request message to the WLAN system network element through the core network element; and receiving a transmission address response message from the WLAN system network element through the core network element, wherein the transmission address response message comprises the at least one of the IP address information or the port number information of the WLAN system network element, wherein the transmission address request message comprises equipment flag information of the WLAN system network element, or, the transmission address request message comprises equipment flag information of the access side network element of the 3GPP system and the equipment flag information of the WLAN system network element; and the transmission address response message comprises the equipment flag information of the access side network element of the 3GPP system, or, the transmission address response message comprises the equipment flag information of the access side network element of the 3GPP system and the equipment flag information of the WLAN system network element.

5. The device according to claim 4, wherein the device is located in an Evolved NodeB (eNB) or a Radio Network Controller (RNC), and the WLAN system network element is a Wireless LAN Termination (WT) or an AP or an Access Controller (AC).

6. The device according to claim 4, wherein the processor is further configured to:

if the WLAN system network element fails to process the transmission address request message, receive a transmission address response failure message through the core network element, wherein the transmission address response failure message comprises the equipment flag information of the access side network element of the 3GPP system and at least one of the equipment flag information of the WLAN system network element, a failure cause or waiting time, and wherein the waiting time is configured to indicate the access side network element of the 3GPP system to reinitiate an acquisition flow after the waiting time expires.

* * * * *